United States Patent [19]

Fujii et al.

[11] Patent Number: 4,680,318

[45] Date of Patent: Jul. 14, 1987

[54] FOAMING RESIN COMPOSITION

[75] Inventors: Masaki Fujii; Shiroh Gotoh; Hideaki Nakagawa; Ryoichi Ito, all of Mie, Japan

[73] Assignee: Mitsubishi Petrochemical Co., Ltd., Tokyo, Japan

[21] Appl. No.: 928,040

[22] Filed: Nov. 7, 1986

[30] Foreign Application Priority Data

Nov. 14, 1985 [JP] Japan ................. 60-255698
Nov. 14, 1985 [JP] Japan ................. 60-255699

[51] Int. Cl.$^4$ ................................ C08J 9/10
[52] U.S. Cl. ........................ 521/95; 521/96; 521/150
[58] Field of Search .............. 521/150, 96, 95; 526/336

[56] References Cited

U.S. PATENT DOCUMENTS

| | | | |
|---|---|---|---|
| 3,891,724 | 6/1975 | Yaeda et al. | 521/150 |
| 3,933,769 | 1/1976 | Lal et al. | 526/336 |
| 3,991,262 | 11/1976 | Lal et al. | 526/336 |
| 4,604,408 | 8/1986 | Newberg | 521/150 |
| 4,607,060 | 8/1986 | Kimiec et al. | 521/150 |

Primary Examiner—Morton Foelak
Attorney, Agent, or Firm—Oblon, Fisher, Spivak, McClelland, & Maier

[57] ABSTRACT

A foaming resin composition comprising an unsaturated random copolymer consisting of propylene, ethylene, and a branched 1,4-diene represented by the following formula:

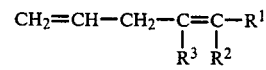

wherein $R^1$ represents an alkyl group having not more than 8 carbon atoms; and $R^2$ and $R^3$ each represents a hydrogen atom or an alkyl group having not more than 8 carbon atoms, provided that $R^2$ and $R^3$ do not simultaneously represent a hydrogen atom, and a chemical foaming agent. The composition is prevented from increasing in temperature due to shearing during molding into a foamable sheet and, therefore, provides a uniform foamed product.

16 Claims, No Drawings

FOAMING RESIN COMPOSITION

FIELD OF THE INVENTION

This invention relates to a foaming resin composition comprising a propylene-based unsaturated random copolymer obtained by random copolymerization of propylene, ethylene, and a specific 1,4-diene.

BACKGROUND OF THE INVENTION

Foamed plastics are advantageously used in a wide field because of their functions, such as heat insulation, cushioning, and the like.

High extents of foaming of foamed plastics have been achieved by improvement of retention of cells during foaming by crosslinking or use of resins impregnated with a large quantity of a physical foaming agent. The former technique is preferred for obtaining foamed plastics having a uniform structure and excellent physical properties.

On the other hand, propylene-based resins are used in a very large field due to their excellent properties, such as moldability, transparency, electrical insulating properties, water resistance, chemical resistance, mechanical strength, and the like. However, in the propylene-based resins, cleavage of the main chain takes place by the action of a radical in preference to crosslinking reaction so that they are not easily crosslinked by radical crosslinking with peroxides or radiation, thus, failing to provide highly expanded foams. It has been proposed, as a countermeasure, to incorporate various crosslinking auxiliaries comprising polyfunctional compounds. However, this method encounters problems, such as non-uniformity in crosslinking, bleeding of low molecular weight substances, deterioration of weather resistance, reduction in various physical properties, and the like.

Many inventions have hitherto been disclosed with respect to copolymerization of α-olefins and non-conjugated dienes. Among them, the most relevant to the present invention are techniques described in British Pat. No. 1,268,149 and U.S. Pat. Nos. 3,933,769 and 3,991,262.

British Pat. No. 1,268,149 discloses use of a special titanium trichloride composition which is finely dispersed into a colloid as a transition metal component of a polymerization catalyst, thereby to provide a colloidal copolymer having an average particle size of from 0.02 to 0.5 μm. With the purpose of producing fine copolymer particles for thin layer coating, the special titanium trichloride catalyst component is prepared by reducing titanium tetrachloride with an organic aluminum compound in the presence of a small amount of an α-olefin having 6 or more carbon atoms. Use of such a fine catalyst component leads to the production of markedly fine particles of the unsaturated copolymer. As a result, serious problems are likely to occur in the production on an industrial scale, such as an increase of viscosity in a polymerization vessel, difficulty in removal of polymerization heat, difficulty in recovery of the resulting unsaturated copolymer, and the like.

U.S. Pat. Nos. 3,933,769 and 3,991,262 relate to copolymers of α-olefins having from 4 to 12 carbon atoms and methyl-1,4-hexadiene, and are characterized in that the resulting copolymers are rubbery products. Therefore, these techniques are not applicable to production of resinous copolymers.

Seeking for a solution of problems associated with the conventional techniques, the inventors have previously proposed crosslinkable propylene-based unsaturated copolymer resins as disclosed in Japanese Patent Laid-Open Application Nos. 98534/82 and 210930/83. Nevertheless, these resins are not necessarily satisfactory as foamable molding materials. More specifically, when the propylene-based unsaturated copolymer resin is kneaded with a foaming agent, the melt viscosity is so high that heat is generated by shearing to raise the resin temperature above the decomposition temperature of the foaming agent. As a result, it is likely that a gas is evolved due to decomposition of the foaming agent during kneading to form large or small cells in the molded product, which ultimately leads to disadvantages, such as formation of large voids in the final foams, non-uniformity in cell size or low rates of expansion reached.

SUMMARY OF THE INVENTION

One object of this invention is to provide a foaming resin composition which is prevented from heat generation due to shearing upon molding in a crosslinking-foamable sheet thereby to produce a uniform foamed product.

Another object of this invention is to provide a foaming resin composition which provides a foamed product that can be printed or coated on its surface and is, therefore, suitably applicable as exterior or interior parts or surface materials for automobiles or appliances, soft and heat-resistant wire covering materials, and the like.

As a result of extensive investigations to eliminate the above-described disadvantages, the inventors have succeeded to prepare an excellent foaming molding material by using a specific propylene-based unsaturated random copolymer having a limited melting point.

The present invention relates to a foaming resin composition comprising an unsaturated random copolymer consisting of from 85 to 99.4 mol % of propylene, from 0.5 to 14 mol % of ethylene, and from 0.1 to 10 mol % of a branched 1,4-diene represented by the following formula (I) and a chemical foaming agent, said chemical foaming agent being employed in an amount of from 0.1 to 30% by weight based on the total weight of the composition The formula (I) is represented by:

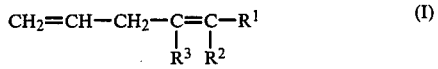

wherein $R^1$ represents an alkyl group having not more than 8 carbon atoms; and $R^2$ and $R^3$ each represents a hydrogen atom or an alkyl group having not more than 8 carbon atoms, provided that $R^2$ and $R^3$ do not simultaneously represent a hydrogen atom.

DETAILED DESCRIPTION OF THE INVENTION

The term "random copolymer" as used herein means not only a copolymer wherein the propylene unit, ethylene unit and branched 1,4-diene unit represented by the above-described formula (I) are distributed perfectly at random but a copolymer having tapered distribution of the branched 1,4-diene unit represented by the formula (I) within the individual copolymer molecule or among the molecules.

The branched 1,4-diene which can be copolymerized with propylene and ethylene is represented by the above-described formula (I).

In the formula (I), the alkyl group as represented by $R^1$, $R^2$ or $R^3$ preferably has not more than 5 carbon atoms.

Specific examples of the branched 1,4-diene represented by the formula (I) include 4-methyl-1,4-hexadiene, 5-methyl-1,4-hexadiene, 4-ethyl-1,4-hexadiene, 4,5-dimethyl-1,4-hexadiene, 4-methyl-1,4-heptadiene, 4-ethyl-1,4-heptadiene, 5-methyl-1,4-heptadiene, 4-ethyl-1,4-octadiene, 5-methyl-1,4-octadiene, 4-n-propyl1,4-decadiene, etc. The preferred examples among them are 4-methyl-1,4-hexadiene and 5-methyl-1,4-hexadiene.

These branched 1,4-dienes may be used either individually or in combination of two or more thereof. In particular, a mixture of 4-methyl-1,4-hexadiene and 5-methyl-1,4-hexadiene at a mixing ratio of from about 95:5 to 5:95 by mol is preferred.

The unsaturated random copolymer which can be used in the present invention contains from 85 to 99.4 mol %, preferably from 88 to 99 mol %, more preferably from 90 to 98.5 mol %, of propylene; from 0.5 to 14 mol %, preferably from 0.7 to 10 mol %, more preferably from 1 to 8 mol %, of ethylene; and from 0.1 to 10 mol %, preferably from 0.3 to 6 mol %, more preferably from 0.5 to 4 mol %, of the branched 1,4-diene.

If the branched 1,4-diene content is less than 0.1 mol %, reactivity ascribed to unsaturated bonds in the side chains cannot be exerted sufficiently as intended. A branched 1,4-diene content exceeding 10 mol % heightens crosslinking efficiency but unfavorably brings about reduction of polymerization rate or increased byproduction of amorphous polymers.

If the ethylene content is less than 0.5 mol %, the melting point of the copolymer is too high, while if it exceeds 14 mol %, the copolymer has too low a modulus of elasticity, deviating from the objects of the present invention.

If the propylene content is less than 85 mol %, the decrease of modulus of elasticity, reduction of polymerization rate, increase of by-produced solvent-soluble polymers, and the like unfavorably occur. On the other hand, if the propylene content exceeds 99.4 mol %, the contents of the branched 1,4-diene and ethylene become too low, which leads to the failure of the purposes.

The unsaturated random copolymer according to this invention has such a molecular weight as having a melt flow rate (MFR) of from 0.1 to 200 g/10 min, preferably from 0.2 to 100 g/10 min, and more preferably from 0.5 to 50 g/10 min, as determined at 230° C. under a load of 2.16 kg in accordance with JIS K-6758. Molecular weights out of this range make it difficult to mold the foaming resin composition The melting point of the unsaturated random copolymer according to the present invention is an important indication of its low temperature molding properties. The melting point herein referred to is a temperature at the melting peak according to differential scanning calorimetry (DSC) and is selected from the range of from 110° to 153° C., preferably from 115° to 150° C., and more preferably from 125° to 145° C. If the melting point is higher than the above upper limit, the low temperature molding properties of the copolymer cannot be obtained. Unsaturated random copolymers having too low a melting point cannot show thermal resistance inherent to propylene-based resins and are also in a rubbery state that does not meet the purposes of this invention.

The unsaturated random copolymers of the present invention can be prepared by using as a polymerization catalyst a Ziegler-Natta catalyst essentially composed of a halogen compound of titanium as a transition metal component or the composition thereof and an organic metal compound. Catalysts for stereoregular polymerization of α-olefins are preferred.

The halogen compound of titanium or a composition thereof preferably includes titanium trichloride obtained by various processes, and a titanium chloride-containing solid catalyst component carried on a carrier, e.g., magnesium chloride, etc. The titanium trichloride specifically includes a composition obtained by reducing titanium tetrachloride with an organic aluminum compound, treating the reduction product with a complexing agent, and further treating the product with a Lewis acid, e.g., titanium tetrachloride, etc., a composition obtained by precipitation from liquefied titanium trichloride using a complexing agent, preferably followed by treatment with a Lewis acid, e.g., titanium tetrachloride, etc., and the like. The titanium chloride-containing solid catalyst component on carrier particularly includes a titanium component on a carrier essentially comprising magnesium, chlorine, titanium and an electron donor. Specific examples of the solid catalyst components are described, e.g., in Japanese Patent Laid-Open Application Nos. 40293/79, 82103/79, 94591/79, 59069/80, 19307/83, 32604/83, 32605/83, 117205/83, 183708/83, 149905/84 and 130607/85.

The organic metal compound preferably includes organic compounds of metals selected from typical elements belonging to the Groups I to III of the Periodic Table, with organic aluminum compounds being more preferred. Examples of the organic aluminum compounds are those represented by formula

wherein $R^4$ represents a hydrocarbon residue having from 1 to about 10 carbon atoms; X represents a hydrogen atom, a halogen atom, an alkoxy group having from 1 to about 15 carbon atoms, an aryloxy group, or a siloxy group; and n is a number in the range of $0 < n \leq 3$.

Specific examples of such organic aluminum compounds are trialkylaluminums, e.g., trimethylaluminum, triethylaluminum, triisobutylaluminum, etc.; dialkylaluminum halides, e.g., diethylaluminum chloride, etc.; dialkylaluminum hydrides, e.g., diethylaluminum hydride, etc.; alkylaluminum sesquihalides, e.g., methylaluminum sesquichloride, ethylaluminum sesquichloride, etc.; alkylaluminum dihalides, e.g., ethylaluminum dichloride, etc.; dialkylaluminum alkoxides or aryloxides, e.g., diethylaluminum ethoxide, diethylaluminum (2,6-di-t-butyl)phenoxide, etc.; dialkylaluminum siloxides, e.g., diethylaluminum trimethylsiloxide, etc.; and the like. These organic aluminum compounds may be reaction products with water or amines. The organic aluminum compounds may be used either individually or in combination of two or more thereof.

In addition to the transition metal component and the organic metal component, the catalyst may further contain a third component for various purposes, such as improvement of stereoregularity. The third component includes electron donors, iodine, etc., to advantage. Examples of the electron donors are carboxylic acid esters, sulfides, ethers, phosphines, phosphine oxides, phosphoric amides, amines, organic antimony compounds, phosphoric esters, phosphites, amine oxides, cinnamic esters, and the like.

Copolymerization of propylene, ethylene and the branched 1,4-diene represented by the formula (I) can usually be carried out under conditions employed for polymerization using a Ziegler-Natta catalyst wherein the transition metal component is a halogen-containing titanium compound or the composition thereof. More specifically, the polymerization is carried out at a temperature of from 0° to 200° C., preferably from 20° to 150° C., and more preferably from 30° to 100° C., under a pressure of from atmospheric pressure to 150 kg/cm$^2$, preferably from atmospheric pressure to 90 kg/cm$^2$, and more preferably from atmospheric pressure to 50 kg/cm$^2$.

The manner of polymerization to be adopted in the present invention is not particularly restricted and includes a slurry or solution method using an inert solvent, a slurry or solution method using substantially no solvent in which at least one of propylene, ethylene and branched 1,4-dienes serves as a solvent, a gaseous phase method using substantially no liquid solvent in which every monomer is maintained under substantially gaseous condition, and the like.

In order to obtain random copolymers, it is necessary that every monomer be present at the time of polymerization, but the comonomer ratio is not required to be constant with time. That is, it may be convenient to feed each monomer at a constant mixing ratio, or it is also possible to vary the monomer mixing ratio with time. Further, any of the monomers may be added in divided portions with consideration for copolymerization reaction ratio.

Control of the molecular weight can be effected by using hydrogen with surprisingly greater ease than in the case of using ethylidene norbornene or 1,4-hexadiene as a comonomer.

The chemical foaming agents which can be used in the present invention suitably include inorganic chemical foaming agents, e.g., sodium hydrogencarbonate, etc.; and organic chemical foaming agents, e.g., N,N'-dinitrosopentamethylenetetramine, azodicarbonamide, diphenylsulfon-3,3'-disulfonylhydrazide, 4,4'-diphenyldisulfonylazide, trihydrazinotriazine, p-toluenesulfonylsemicarbazide, barium azodicarboxylate, benzene-1,3-disulfonylhydrazide, 4,4'-oxybis(benzenesulfonylhydrazide), 5-phenyltetrazole, etc. Of these, the organic chemical foaming agents are preferred, with azodicarbonamide being most commonly employed.

The amount of the chemical foaming agent to be incorporated ranges from 0.1 to 30% by weight, preferably from 0.5 to 30% by weight, more preferably from 1 to 20% by weight, particularly preferably from 2 to 17% by weight, based on the total weight of the foaming resin composition. If it is less than 0.1% by weight, a sufficient rate of expansion cannot be obtained. If it exceeds 30% by weight, the rat of expansion increases excessively, making it difficult to obtain uniform cell diameter and seriously reducing strength of the resulting foamed product.

The foaming resin composition according to this invention can further comprise an α-olefin-based polymer for the purpose of controlling various physical properties of foamed products finally obtained.

The α-olefin-based polymers which can be used in this invention include homo- or copolymers of α-olefins, such as ethylene, propylene, butene-1, etc., and copolymers of these olefins and other vinyl compounds. Specific examples of such α-olefin-based polymers are polyethylene, a copolymer of ethylene and other α-olefin, a copolymer of ethylene and an unsaturated organic acid or the ester thereof, polypropylene, and a copolymer of propylene and other α-olefin (e.g., ethylene, 1-butene, 4-methyl-1-pentene, 1-hexene, etc.). Of these, propylene-based copolymers containing propylene as a major component are preferred. However, α-olefin-based polymers having a melting point exceeding 155° C. as determined by differential scanning calorimetry (DSC) are unfavorable since they readily induce decomposition of chemical foaming agents. Therefore, the most preferred α-olefin-based polymers are propylene-based copolymers containing propylene as a major component and other α-olefin, particularly ethylene, 1-butene, 1-hexene, etc., as a comonomer and having a melting point (DSC) of not more than 155° C., particularly not more than 145° C.

The amount of the α-olefin-based polymer to be used in this invention is up to 5,000 parts by weight, preferably from 1 to 2,000 parts by weight, and more preferably from 3 to 1,000 parts by weight, per 100 parts by weight of the unsaturated random copolymer. If the amount of the α-olefin-based polymer exceeds 5,000 parts by weight, the unsaturated random copolymer becomes too thin to show sufficient crosslinking effects.

If desired, the foaming resin composition of the present invention may furthermore contain a known crosslinking auxiliary, such as triallyl cyanurate, triallyl isocyanurate, etc. A radical generator may also be added depending on the method of crosslinking as hereinafter described.

In addition, the foaming resin composition of the invention may contain various additives in such proportions that do not impair the effects of the present invention. Such additives include phenol type, sulfur type, phosphorus type or amine type stabilizers for various purposes, i.e., radiation stabilizers, anti-oxidants, thermal stabilizers, ultraviolet absorbents, antistatics, etc.; inorganic fillers, e.g., silica, mica, talc, calcium carbonate, carbon black, glass fibers, glass microspheres, carbon fibers, gypsum, clay, aluminum hydroxide, magnesium hydroxide, titanium oxide, etc.; colorants or pigments, flame retardants, surface active agents, crosslinking inhibitors or retarders, crosslinking auxiliaries, and the like.

The method of producing crosslinked foams from the foaming resin composition of the invention is conventional. If desired, the foaming resin composition containing, if necessary, a crosslinking agent, e.g., a radical generator such as organic peroxides, etc., may be once pelletized. The foaming resin composition or pellets thereof are melt-kneaded and molded. Simultaneously with or after the molding, the foaming resin composition is subjected to crosslinking, followed by or simultaneously with foaming.

The molding can be performed by a general method employed for thermoplastic resins. However, when radiation-induced crosslinking is desired, the molded article may have a limitation on its thickness depending on the radiation transmission. For instance, in the case of using electron rays for crosslinking, sheet molded articles having a thickness of not more than 5 mm are preferred.

It is essential that the molding temperature should be between the melting point of the resinous component of the foaming resin composition and the decomposition temperature of the chemical foaming agent. Decomposition of the chemical foaming agent during molding before crosslinking should be avoided because such would cause reduction of expansion rate or void formation, resulting in failure. More specifically, the kneading and molding should be carried out at a temperature ranging from 110° to 230° C., preferably from 120° to 190° C., and more preferably from 130° to 170° C., in the case where chemical foaming agents having relatively high decomposition temperatures, which are favorably used, are selected.

Methods of crosslinking include radical crosslinking, radiation crosslinking, sulfur compound crosslinking, resin crosslinking, quinoid crosslinking, and the like, with the former two methods being preferred. In particular radiation crosslinking is most preferred.

In radiation-induced crosslinking, radiation to be employed includes γ-rays emitted from cobalt 60, cesium 137, etc., electron rays emitted from an electron accelerator, X-rays generated from an X-ray generator, ultraviolet rays, proton rays, α-rays, β-rays, neutron rays. etc. The preferred among them are γ-rays from radiation sources that have become easily available owing to the development of atomic industry and electron rays that can be obtained at high radiation doses at relatively low cost owing to technical improvements of accelerators. In the present invention, use of electron rays is particularly convenient.

The radiation dose usually ranges from 0.01 to 50 Mrad, preferably from 0.1 to 20 Mrad, and more preferably from 0.5 to 10 Mrad.

The crosslinking temperature to be employed for radiation-induced crosslinking is not particularly restricted, as is a great feature of radiation cross-linking. Usually, it is in the range between −10° C. and the melting point or softening point of the foaming resin composition of the invention, and preferably between 10° C. and 100° C. Temperatures out of the above range may also be used without any problem. There is no particular limitation to the atmosphere, and crosslinking can be effected under any of an air atmosphere, an inert gas atmosphere or a vacuum atmosphere. In particular, crosslinked foams produced by electron-induced crosslinking under an oxygen-containing atmosphere are preferred because of their surface characteristics, such as adhesion, coating properties, printability, and the like. Radiation cross-linking may be performed in the copresence of organic peroxides, sulfur, sulfur compounds, vulcanization accelerators, etc., if desired.

In the case of radical crosslinking using a radical generator, organic peroxides, e.g., hydroperoxide, dialkyl peroxides, diacyl peroxides, peracid esters, ketone peroxide, etc., inorganic peroxides, e.g., hydrogen peroxide, persulfates, metal peroxides, etc., azo compounds, mono- or disulfides, metal chelates, redox initiators, and the like are compounded into the foaming resin composition of the invention in advance. Of these, the organic peroxides are used to advantage. Inter alia, those which are decomposed to half in a half life period of 1 minute at a temperature not lower than 100° C., preferably not lower than 120° C., and more preferably not lower than 140° C., can be used to advantage. Specific examples of the organic peroxides which can be used preferably are 2,5-dimethylhexane-2,5-dihydroperoxide, di-t-butyl peroxide, t-butylcumyl peroxide, dicumyl peroxide, α,α'-bis(t-butyl peroxy)-p-diisopropylbenzene, 2,5-dimethyl-2,5-di(t-butyl peroxy)hexane, 2,5-dimethyl-2,5-di(t-butyl peroxy)hexyne-3, benzoyl peroxide, t-butyl peroxyisopropyl carbonate, and the like.

These radical generators are used usually in an amount of from 0.01 to 5% by weight, and preferably from 0.05 to 2% by weight, based on the total weight of the foaming resin composition. The radical crosslinking is carried out in a usual manner. A preferred method comprises melt-kneading the foaming resin composition containing the radical generator in a melt-extruder, etc., and heating the mixture during the kneading or after the molding. These procedures may be performed either in a batch system or in a continuous system. The heating is preferably conducted after the molding since excessive progress of crosslinking during the kneading increases the viscosity, thereby inducing decomposition of the chemical foaming agent due to shearing heat generation or making molding difficult. The heating temperature should be less than the decomposition temperature of the chemical foaming agent used. In a particular case of using azodicarbonamide as a chemical foaming agent, the heating temperature is preferably not more than 190° C., and more preferably not more than 170° C.

When a chemical foaming agent having a low decomposition temperature, such as sodium hydrogen-carbonate is used, foaming is usually effected simultaneously with crosslinking under pressure at a temperature in the vicinity of the melting point or softening point of the foaming resin composition of the invention or a temperature higher than that. When using a chemical foaming agent having a relatively high decomposition temperature, such as azodicarbonamide, the foaming resin composition is heated at a temperature of from 120° to 300° C., preferably from 150° to 270° C., more preferably from 180° to 250° C., under atmospheric pressure or under pressure to effect foaming simultaneously with or after crosslinking.

The present invention will now be illustrated in greater detail by way of examples, but it should be understood that these examples are not limiting the present invention. In these preparation examples, polymers were produced by slurry polymerization, but the present invention is not limited to this embodiment.

Physical properties of the polymers or foams prepared in Preparation Examples, Reference Preparation Example, Examples and Reference Examples were determined by the following test methods:

(1) Melt Flow Rate (MFR) (g/10 min):
JIS K-6758 (230° C., 2.16 kg)
(2) Density (g/cm$^3$):
JIS K-7112
(3) Modulus of Elasticity in Three-Point Bending (kg/cm$^2$):
JIS K-7203
(4) Tensile Stress at Yield (kg/cm$^2$):
JIS K-6758
(5) Tensile Stress at Break (kg/cm$^2$):
JIS K-6758
(6) Tensile Elongation at Break (%):
JIS K-6758
(7) Haze (%):
JIS K-6714
(8) Melting Point (°C.):
DSC peak value
(9) Comonomer Composition (mol %):
$^1$H-NMR
(10) Gel Content (wt %):
Weight percents of a residue after extraction with boiling xylene for 10 hours.

PREPARATION EXAMPLE 1

In a 100 l-volume autoclave was charged 40 l of a mixture of 4-methyl-1,4-hexadiene and 5-methyl-1,4-hexadiene at a mixing ratio of 8:2 (by mol) (hereinafter referred to as methyl-1,4-hexadiene), and 18 g of diethylaluminum chloride and 4.1 g of titanium trichloride manufactured by Solvay-Marubeni Chemicals Co., Ltd. were added thereto in this order. Hydrogen and propylene were then fed to the mixture so as to have a total pressure of 1.5 kg/cm$^2$ (gauge pressure) and a hydrogen concentration of 2.0% by volume, at which the mixture was maintained at 25° C. for 15 minutes. Propylene was further fed thereto under pressure so as to have a total pressure of 6.5 kg/cm$^2$ (gauge pressure) and a hydrogen concentration of 6.8% by volume to effect polymerization at 55° C. for 6 hours. During the polymerization, 0.48 kg of ethylene was fed to the system at a constant rate.

After the polymerization, 0.8 l of n-butanol was added thereto to inactivate the catalyst. To the mixture was further added water in order to extract the catalyst residue. The thus obtained mixture was subjected to centrifugation to recover a solid copolymer, which was then dried. The resulting copolymer weighed 7.5 kg and had a bulk density of 0.46 g/ml. Various physical properties of the copolymer are shown in Table 1.

On the other hand, the filtrate of the polymerization slurry was concentrated to recover 1.1 kg of an amorphous polymer.

PREPARATION EXAMPLE 2

The same procedure as in Preparation Example 1 was repeated, except that the polymerization was carried out at 55° C. under a total pressure of 6 kg/cm$^2$ (gauge pressure) and at a hydrogen concentration of 3.1 vol %. There were obtained 5.2 kg of a copolymer having a bulk density of 0.43 g/cm$^3$ and 1.3 kg of an amorphous polymer. The physical properties of the resulting copolymer are shown in Table 1.

PREPARATION EXAMPLE 3

In a 200 l-volume autoclave was charged 20 l of hexane, and 51 g of diethylaluminum chloride and 10 g of titanium trichloride manufactured by Solvay-Marubeni Chemicals Co., Ltd. were added thereto in this order. Hydrogen and propylene were then fed thereto so as to have a total pressure of 1.0 kg/cm$^2$ (gauge pressure) and a hydrogen concentration of 2.0 vol %, and the system was maintained under these conditions at 40° C. for 10 minutes. 50 l of methyl-1,4-hexadiene was fed to the system under pressure. Propylene was further fed to the system under pressure, and polymerization was carried out at 55° C. for 5 hours, while controlling a total pressure of 5 kg/cm$^2$ (gauge pressure) and a hydrogen concentration of 3.2 vol %. During the polymerization, 0.55 kg of ethylene was fed.

After the polymerization, 2.5 l of methanol was added to the reaction mixture to inactivate the catalyst. To the mixture was further added water in order to extract the catalyst residue. The thus obtained mixture was centrifuged to recover a solid copolymer, which was then dried. There were obtained 18.5 kg of the copolymer having a bulk density of 0.46 g/cm$^3$ and 1.7 kg of an amorphous polymer. The physical properties of the resulting copolymer are shown in Table 1.

PREPARATION EXAMPLE 4

Preparation of Catalyst-on-Carrier 100 ml of dehydrated and deoxidized n-heptane was introduced to a flask the atmosphere of which had been sufficiently displaced by nitrogen, and 0.1 mol of MgCl$_2$, 0.195 mol of Ti(O-n-C$_4$H$_9$)$_4$ and 0.007 mol of n-C$_4$H$_9$OH were then added thereto to effect reaction at 90° C. for 2 hours. After completion of the reaction, 15 ml of methyl hydropolysiloxane (20 centistokes) was introduced thereto at 40° C., followed by allowing the mixture to react for 3 hours. The formed solid component was washed with n-heptane.

To a flask having its atmosphere sufficiently displaced by nitrogen was introduced the resulting solid component in an amount of 0.03 mol on Mg atom conversion (Mg content=4.3 wt %), and 50 ml of dehydrated and deoxidized n-heptane was fed thereto. A mixture of 25 ml of n-heptane, 0.0025 mol of ethyl benzoate and 0.05 mol of silicon tetrachloride was fed to the mixture at 30° C. over a period of 30 minutes. The temperature was raised to 50° C., and the mixture was allowed to react for 1 hour. After completion of the reaction, the reaction mixture was washed twice with 1 l portions of n-heptane. Then, 12 ml of titanium tetrachloride and 0.0007 mol of ethyl benzoate were added thereto at 30° C. over 30 minutes, followed by allowing the mixture to react at 90° C. for 1 hour. After completion of the reaction, the supernatant was removed. Titanium tetrachloride and ethyl benzoate each in the same amounts as used above were added to the residue, and the mixture was allowed to react at 105° C. for 1 hour. After completion of the reaction, the reaction mixture was thoroughly washed with n-heptane to obtain a catalyst component having a titanium content of 2.53% by weight.

Preparation of Copolymer

In a 200 l-volume autoclave was charged 60 l of methyl-1,4-hexadiene, and 18 g of triethyl aluminum, 7.5 g of diphenyl dimethoxysilane and 4.5 g of the catalyst-on-carrier as above prepared were added thereto in this order. Hydrogen and propylene were fed to the mixture so as to have a total pressure of 1.5 kg/cm$^2$ (gauge pressure) and a hydrogen concentration of 1.0 vol %, and the system was maintained at 40° C. for 15 minutes. Simultaneously with the temperature elevation, feeding of propylene and ethylene was started, and polymerization was effected at 60° C. for 4 hours while controlling the total pressure at 8 kg/cm$^2$ (gauge pressure) and the hydrogen concentration at 1.0 vol %. During the polymerization, 0.95 kg of ethylene was fed at a constant rate.

The resulting polymer slurry was subjected to centrifugation to obtain 16.2 kg of a solid copolymer having a bulk density of 0.42 g/cm$^3$ and 1.4 kg of an amorphous polymer. The physical properties of the resulting copolymer are shown in Table 1.

REFERENCE PREPARATION EXAMPLE 1

The same procedure as described in Preparation Example 1 was repeated, except for using 55 g of diethyl aluminum chloride and 12 g of titanium trichloride produced by Solvay-Marubeni Chemicals Co., Ltd., controlling the total pressure at 4 kg/cm$^2$ (gauge pressure) and the hydrogen concentration at 4.2 vol %, and feeding no ethylene. There were obtained 12.2 kg of a copolymer having a bulk density of 0.46 g/cm³ and 1.2 kg of an amorphous polymer. The physical properties of the resulting copolymer are shown in Table 1.

PREPARATION EXAMPLE 5

The same procedure as in Preparation Example 4 was repeated, except for controlling the total pressure at 6 kg/cm² (gauge pressure) and the hydrogen concentration at 0.4 vol % and feeding 0.90 kg of ethylene. The resulting polymer slurry was centrifuged to obtain 13.0 kg of a powdery copolymer having a bulk density of 0.41 g/cm³ and 1.9 kg of an amorphous polymer. The physical properties of the resulting copolymer are shown in Table 1.

PREPARATION EXAMPLE 6

The same procedure as in Preparation Example 4 was repeated, except for using 2.2 g of the catalyst-on-carrier, controlling the total pressure at 11 kg/cm² (gauge pressure) and the hydrogen concentration at 5.2 vol %, and feeding 1.30 kg of ethylene. The resulting polymer slurry was centrifuged to obtain 15.8 kg of a powdery copolymer having a bulk density of 0.40 g/cm³ and 3.7 kg of an amorphous polymer. The physical properties of the resulting copolymer are shown in Table 1.

Preparation Example 1 and a propylene-ethylene random copolymer having an MFR of 1.2 g/10 min and an ethylene content of 5.1 wt % were blended in a proportion as shown in Table 2. The blend was further mixed with azodicarbonamide as a chemical foaming agent and a phenol type antioxidant in such amounts that they occupied 15 wt % and 0.09 wt %, respectively, based on the whole foaming resin composition by means of a supermixer. The resulting compound was kneaded at 145° C. (160° C. in the case of using the resin of Reference Preparation Example 1) and molded in a 1.8 mm thick sheet by means of a single screw extruder of 50 mm in diameter having a coat-hanger die of 300 mm in width.

The resulting sheet was irradiated with accelerated electron rays at an accelerating voltage of 2 MeV and an accelerating current of 5 mA at room temperature under air blowing until a dose indicated in Table 2 was reached to induce crosslinking.

The irradiated sheet was cut into a square specimen having an edge length of 5 cm, and the specimen was dipped in a molten salt bath at 220° C. for 120 seconds to obtain foams. The resulting foamed product was evaluated in terms of gel content, rate of expansion and cell size distribution. The results obtained are shown in Table 2.

TABLE 1

| | Preparation Example | | | | Reference Preparation | Preparation Example | |
|---|---|---|---|---|---|---|---|
| | 1 | 2 | 3 | 4 | Example 1 | 5 | 6 |
| MFR (g/10 min) | 3.82 | 1.17 | 0.84 | 1.10 | 2.85 | 1.40 | 12.0 |
| Density (g/cm³) | 0.888 | 0.887 | 0.891 | 0.889 | 0.896 | 0.885 | 0.891 |
| Comonomer Composition (mol %): | | | | | | | |
| Methyl-1-1,4-hexadiene | 2.0 | 2.2 | 1.8 | 2.7 | 2.9 | 3.6 | 1.4 |
| Ethylene | 4.7 | 5.2 | 2.4 | 5.2 | 0 | 6.1 | 7.4 |
| Melting Point (DSC Melting Peak Temperature) (°C.) | 132.8 | 131.7 | 140.8 | 131.1 | 153.2 | 128.0 | 124.1 |
| Modulus of Elasticity in Three-Point Bending (kg/cm²) | 4,900 | 4,500 | 7,100 | 3,700 | 7,400 | 3,200 | 2,900 |
| Tensile Stress at Yield (kg/cm²) | 191 | 180 | 255 | 165 | 220 | 153 | 151 |
| Tensile Stress at Break (kg/cm²) | 382 | 410 | 410 | 398 | 365 | 372 | 380 |
| Tensile Elongation at Break (%) | 880 | 850 | 790 | 845 | 830 | 870 | 890 |
| Haze (%) | 41 | 32 | 35 | 33 | 52 | 31 | 30 |

EXAMPLES 1 TO 12 AND REFERENCE EXAMPLE 1

Each of the unsaturated random copolymers prepared in Preparation Examples 1 to 6 and Reference

TABLE 2

| | Composition (part by wt) | | Radiation Dose (Mrad) | Foamed Product | | |
|---|---|---|---|---|---|---|
| | Unsaturated Copolymer | PE* Copolymer | | Gel Content (wt %) | Rate of Expansion (time) | Cell Size Distribution |
| Example 1 | Prep. Ex. 1 100 | 0 | 3 | 41 | 19 | Uniform |
| Example 2 | Prep. Ex. 2 100 | 0 | 3 | 43 | 19 | " |
| Example 3 | Prep. Ex. 2 75 | 25 | 3 | 53 | 19 | " |
| Example 4 | Prep. Ex. 2 50 | 50 | 3 | 51 | 20 | " |
| Example 5 | Prep. Ex. 2 25 | 75 | 3 | 46 | 20 | " |
| Example 6 | Prep. Ex. 3 100 | 0 | 3 | 41 | 19 | " |
| Reference Example 1 | Reference Prep. Ex. 1 100 | 0 | 3 | 48 | 16 | Non-uniform |
| Example 7 | Prep. Ex. 4 100 | 0 | 3 | 45 | 20 | Uniform |
| Example 8 | Prep. Ex. 4 | 50 | 1.5 | 50 | 19 | " |

TABLE 2-continued

| | Composition (part by wt) | | Radiation Dose (Mrad) | Foamed Product | | |
|---|---|---|---|---|---|---|
| | Unsaturated Copolymer | PE* Copolymer | | Gel Content (wt %) | Rate of Expansion (time) | Cell Size Distribution |
| Example 9 | Prep. Ex. 4 50 | 50 | 3 | 56 | 22 | " |
| Example 10 | Prep. Ex. 4 50 | 50 | 4 | 59 | 23 | " |
| Example 11 | Prep. Ex. 5 25 | 75 | 3 | 56 | 22 | " |
| Example 12 | Prep. Ex. 6 100 | 0 | 3 | 43 | 20 | " |

Note:
*Propylene-ethylene random copolymer

EXAMPLES 13 AND 14 AND REFERENCE EXAMPLE 2

The unsaturated random copolymer prepared in Preparation Example 6 or Reference Preparation Example 1 and a propylene-ethylene random copolymer having an MFR of 17 g/10 min and an ethylene content of 5.1 wt % were blended in a proportion as shown in Table 3. The blend was further mixed with azodicarbonamide as a chemical foaming agent, 2,5-dimethyl-2,5-di(t-butylperoxy)hexane and a phenol type antioxidant in such amounts that they occupied 15 wt %, 0.5 wt % and 0.09 wt %, respectively, based on the whole foaming resin composition by means of a supermixer. The resulting compound was kneaded at 145° C. and molded in a sheet having a thickness of 1.8 mm by means of a single screw extruder of 50 mm in diameter having a coat-hanger die of 300 mm in width.

The sheet was cut into a square specimen having an edge length of 5 cm. The square specimen was heated in a pressing machine at 180° C. for 5 minutes and then compressed under heating at 220° C. for 4 minutes. Pressure release followed by cooling gave a foamed product. Properties of the resulting foamed product are shown in Table 3.

TABLE 3

| | Composition | | Foamed Product | | |
|---|---|---|---|---|---|
| | Unsaturated Copolymer (part by wt) | PE Copolymer* (part by wt) | Azodicarbonamide (wt %) | Gel Content (wt %) | Rate of Expansion (time) | Cell Size Distribution |
| Example 13 | Preparation Example 6 100 | 0 | 15 | 45 | 24 | Uniform |
| Example 14 | Preparation Example 6 25 | 75 | 15 | 42 | 23 | " |
| Reference Example 2 | Reference Preparation Example 1 100 | 0 | 15 | 53 | 16 | Non-uniform |

Note:
*Propylene-ethylene random copolymer

While the invention has been described in detail and with reference to specific embodiments thereof, it will be apparent to one skilled in the art that various changes and modifications can be made therein without departing from the spirit and scope thereof.

What is claimed is:

1. A foaming resin composition comprising an unsaturated random copolymer consisting of from 85 to 99.4 mol % of propylene, from 0.5 to 14 mol % of ethylene, and from 0.1 to 10 mol % of a branched 1,4-diene represented by the formula (I):

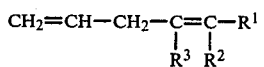

wherein $R^1$ represents an alkyl group having not more than 8 carbon atoms; and $R^2$ and $R^3$ each represents a hydrogen atom or an alkyl group having not more than 8 carbon atoms, provided that $R^2$ and $R^3$ do not simultaneously represent a hydrogen atom, and a chemical foaming agent, said chemical foaming agent being employed in an amount of from 0.1 to 30% by weight based on the total weight of the composition.

2. A foaming resin composition as in claim 1, wherein said unsaturated random copolymer consists of from 88 to 99 mol % of propylene, from 0.7 to 10 mol % of ethylene, and from 0.3 to 6 mol % of branched 1,4-diene.

3. A foaming resin composition as in claim 1, wherein said unsaturated random copolymer consists of from 90 to 98.5 mol % of propylene, from 1 to 8 mol % of ethylene, and from 0.5 to 4 mol % of branched 1,4-diene.

4. A foaming resin composition as in claim 1, wherein said chemical foaming agent is present in an amount of from 0.5 to 30% by weight based on the total weight of the composition 5. A foaming resin composition as in claim 1, wherein said chemical foaming agent is present in an amount of from 1 to 20% by weight based on the total weight of the composition.

6. A foaming resin composition as in claim 1, wherein said chemical foaming agent is azodicarbonamide.

7. A foaming resin composition as in claim 1, wherein said unsaturated random copolymer has a melt flow rate of from 0.1 to 200 g/10 min as determined at 230° C. under a load of 2.16 kg.

8. A foaming resin composition as in claim 1, wherein said unsaturated random copolymer has a melting point of from 110° to 153° C. ad determined by differential scanning calorimetry.

9. A foaming resin composition as in claim 1, wherein said composition further comprises up to 5,000 parts by weight of an α-olefin-based polymer per 100 parts by weight of the unsaturated random copolymer.

10. A foaming resin composition as in claim 9, wherein said α-olefin-based polymer is present in an amount of from 1 to 2,000 parts by weight per 100 parts by weight of the unsaturated random copolymer.

11. A foaming resin composition as in claim 9, wherein said α-olefin-based polymer is present in an amount of from 3 to 1,000 parts by weight per 100 parts by weight of the unsaturated random copolymer.

12. A foaming resin composition as in claim 9, wherein said α-olefin-based polymer has a melting point of not more than 155° C. as determined by differential scanning calorimetry.

13. A foaming resin composition as in claim 9, wherein said α-olefin-based polymer is a propylene-based copolymer containing propylene as a major component.

14. A foaming resin composition as in claim 13, wherein said propylene-based copolymer is a propylene-ethylene copolymer.

15. A foaming resin composition as in claim 1, wherein said composition further comprises a radical generator in an amount of from 0.01 to 5% by weight based on the total weight of the composition.

16. A foaming resin composition as in claim 15, wherein said radical generator is an organic peroxide.

* * * * *